(12) United States Patent
Pierson

(10) Patent No.: US 7,023,154 B1
(45) Date of Patent: Apr. 4, 2006

(54) TRAIN SPEED CONTROL USING CURRENT AND VELOCITY SENSING

(75) Inventor: Martin Pierson, Howell, MI (US)

(73) Assignee: Lionel L.L.C., Chesterfield, MI (US)

( * ) Notice: Subject to any disclaimer, the term of this patent is extended or adjusted under 35 U.S.C. 154(b) by 15 days.

(21) Appl. No.: 10/927,267

(22) Filed: Aug. 26, 2004

(51) Int. Cl.
*A63H 19/24* (2006.01)

(52) U.S. Cl. .................. 318/257; 318/268; 318/432; 104/DIG. 1; 105/1.5; 105/157.2; 446/454

(58) Field of Classification Search ............... 318/256, 318/257, 268, 280, 432, 433; 104/295, DIG. 1; 105/1.4, 1.5, 157.1, 157.2; 238/10 E; 446/454
See application file for complete search history.

(56) References Cited

U.S. PATENT DOCUMENTS

| | | | | |
|---|---|---|---|---|
| 4,085,356 A | * | 4/1978 | Meinema | 318/270 |
| 4,309,645 A | * | 1/1982 | De Villeneuve | 388/829 |
| 6,655,640 B1 | * | 12/2003 | Wolf et al. | 246/167 R |
| 6,765,356 B1 | * | 7/2004 | Denen et al. | 318/6 |

FOREIGN PATENT DOCUMENTS

DE 36 13 429 A1 * 10/1987

* cited by examiner

*Primary Examiner*—Bentsu Ro
(74) *Attorney, Agent, or Firm*—O'Melveny & Myers LLP

(57) ABSTRACT

A method for speed control for a motor of a locomotive of a model electric train is presented. A method in accordance with the present invention includes sensing an operating velocity of the motor and the operating current provided to the motor, and then producing a signal corresponding to the operating velocity and a signal corresponding to the operating current. A method in accordance with the present invention further includes providing the operating velocity signal and operating current signal to a controller and establishing a target motor velocity. A method in accordance with the present invention still further includes calculating a target current configured so that the motor reaches the target motor velocity, and then changing the operating current to the target motor current to achieve the target motor velocity.

20 Claims, 4 Drawing Sheets

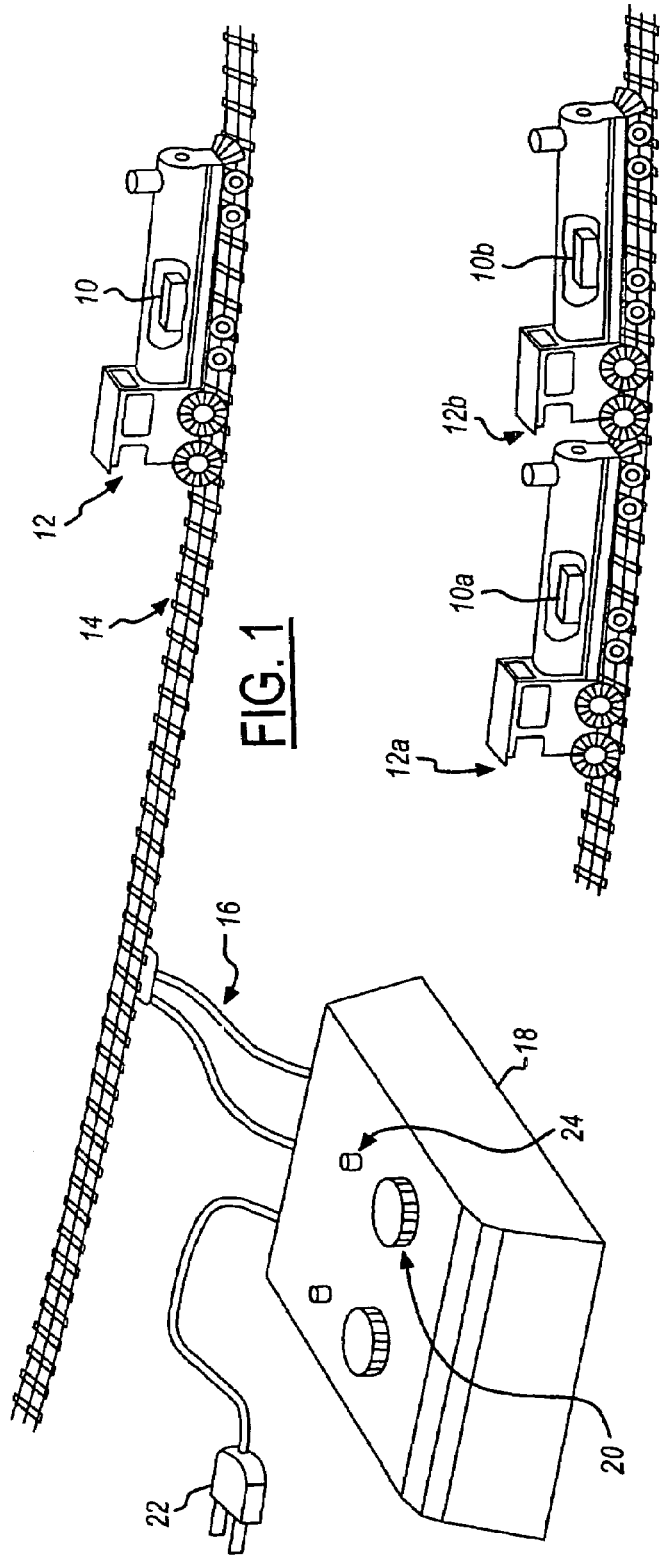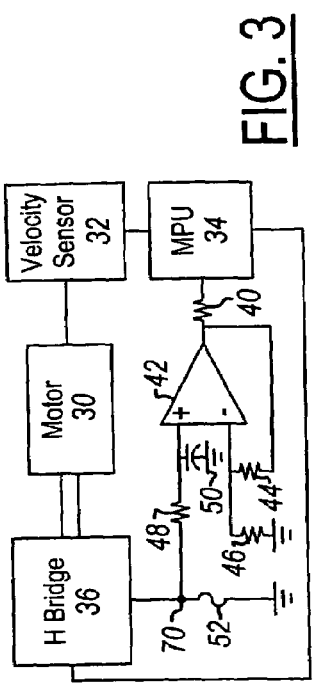

TRAIN SPEED CONTROL USING CURRENT AND VELOCITY SENSING

BACKGROUND OF THE INVENTION

1. Field of the Invention

The invention relates to a speed control system and, in particular, to a current and velocity sensing speed control system using current and velocity sensing on board a model electric train locomotive engine.

2. Description of the Related Art

In electric model toy trains, as in actual trains, a locomotive engine typically pulls a consist, which is the full set of cars which make up a train. The setup typically includes a user control box electrically connected to one or more of the train track rails having one or more levers, dials, or buttons that are manually adjustable by the user. The control box enables the user to control the speed and direction of the electric train by manually controlling the voltage levels supplied to the electronic systems and motor of the locomotive. However, only limited speed control is incorporated into the on-board control system and motor.

One problem with existing speed control systems arises when the user changes the setting of, and thus the voltage supplied to, the locomotive to speed it up or slow it down. With limited speed control, it is difficult for the user to finely control the speed of the electric train. Another problem occurs as a result of fluctuations or spikes in the electrical supply. These spikes can result in undesired increases or decreases in the speed of the electric train that occasionally lead to train derailments, especially on curved sections of track when a train is traveling at faster speeds.

Further, difficulties occur when coupling two or more locomotives together, so-called "lashup," and when one or more locomotives are added to the middle or end of a consist. Although each locomotive draws on a common electrical supply, each can run at a slightly different speed than the other(s). When the speed is not constant between locomotives, the locomotives can fight each other.

SUMMARY OF THE INVENTION

A method for speed control for a motor of a locomotive of a model electric train is presented. A method in accordance with the present invention includes sensing an operating velocity of the motor and the operating current provided to the motor, and then producing a signal corresponding to the operating velocity and a signal corresponding to the operating current. A method in accordance with the present invention further includes providing the operating velocity signal and operating current signal to a controller and establishing a target motor velocity. A method in accordance with the present invention still further includes calculating a target current configured so that the motor reaches the target motor velocity, and then changing the operating current to the target motor current to achieve the target motor velocity.

An apparatus for carrying out the inventive speed control method is also presented. An apparatus in accordance with the present invention includes an electric motor and a current sensor for sensing the operating current provided to the motor. An apparatus in accordance with the present invention further includes a velocity sensor for sensing the operating velocity of the motor, and a controller connected to the motor. The controller is operative to calculate a target current for a target motor velocity and to adjust the operating current to the electric motor to achieve the target current.

BRIEF DESCRIPTION OF THE DRAWINGS

The following features, advantages and other uses of the present invention will become more apparent by referring to the following detailed description and drawings in which:

FIG. 1 is a perspective drawing illustrating the basic components of a model electric train;

FIG. 3 is a simplified schematic block diagram of a speed control system for a locomotive according to one embodiment of the present invention;

FIG. 5 is a perspective drawing illustrating two locomotives coupled together in a lashup configuration.

DETAILED DESCRIPTION

Figure 2A:
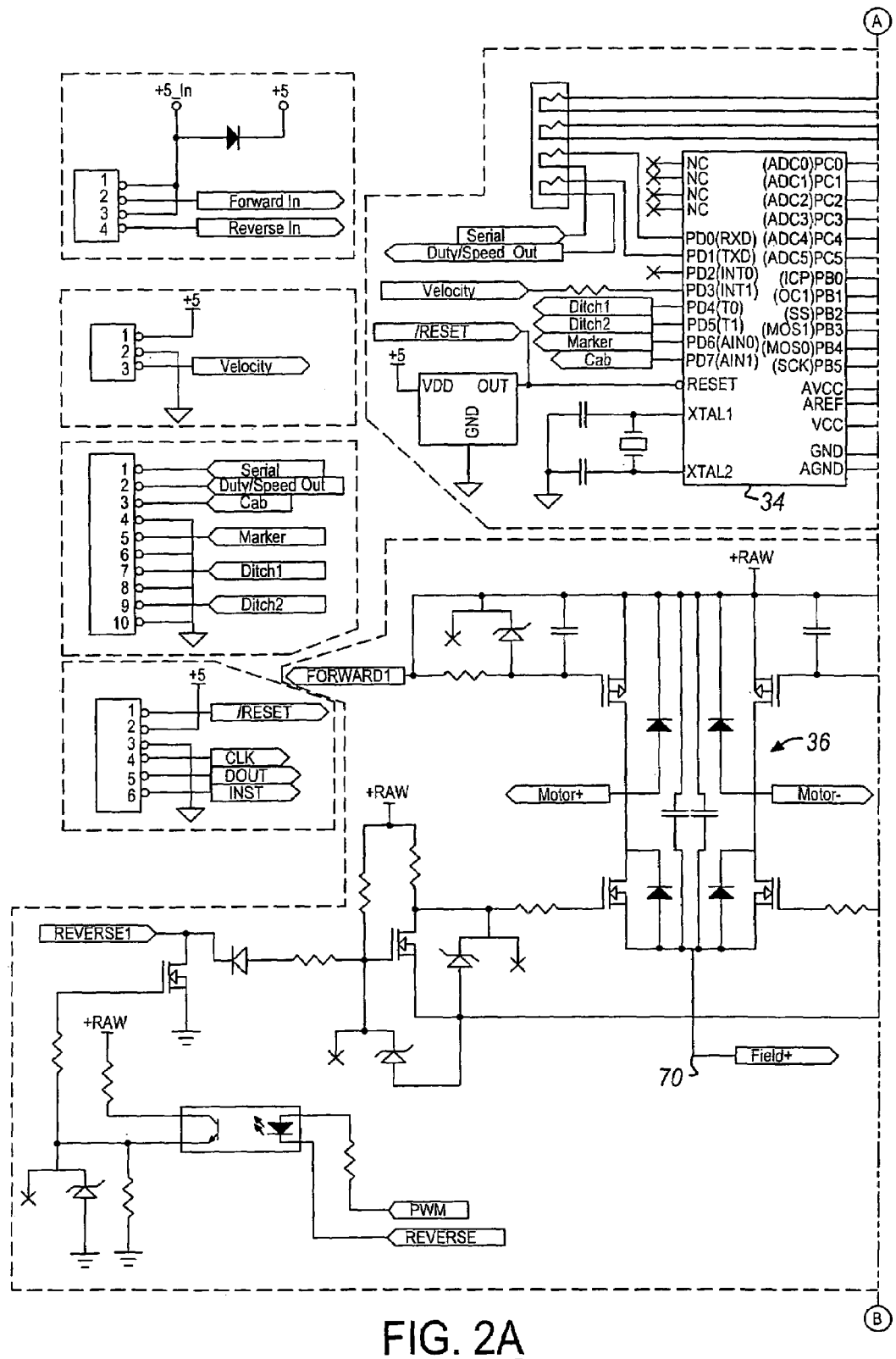
FIGS. 2a–2b are partial schematic views of a circuit diagram of one example of a control system for a locomotive in which the speed control system of the present invention can be incorporated.

The present invention is a speed control system for a model electric train locomotive engine using current and velocity sensing and is described with reference to FIGS. 1–5. FIG. 1 is a perspective drawing of the basic components of a model electric train. In model train systems, a train controller, such as the simple user control box 18 shown in FIG. 1, supplies voltages to the track 14 upon which one or more locomotives 12 ride. Contacts on the bottom of each locomotive 12, or metallic wheels of the locomotive 12, pick up the power from the supply voltage signal applied to the track 14 and supply it to an internal electrical motor of the locomotive 12. Auxiliary loads can be supplied from another rail of the track 14. In an HO system, the supply signal to the track is a direct current (DC) signal. In the electrical train configuration described herein and shown in FIG. 1, the user control box 18 provides an alternating current (AC) electric power supply signal to the track 14.

A transformer, not necessarily incorporated into the user control box 18 but shown so in FIG. 1, provides input power to the user control box 18. The control box 18 controls both the amplitude and polarity of the supply voltage signal applied to the track 14 in response to actions by the user. The amplitude and polarity of the supply voltage signal controls, for example, the speed and direction of the locomotive 12. In FIG. 1, a knob 20 rotatably mounted on a housing of the user control box 18 allows a user to control the desired root-mean-squared average power supplied to the track 14, and thus the desired speed of a track-mounted locomotive 12, by movement of the knob 20. Of course, a knob 20 is used for exemplary purposes only. Any means that allows the user to select a desired steady state train velocity, referred to herein as a set point, is acceptable.

The AC track signal supplied by the transformer of the user control box 18 can be offset by a DC signal used to enable various train accessories, such as a horn, bell or whistle, through relays or other switching devices mounted on the train. In the user control box 18 shown in FIG. 1, pushbuttons 24 are mounted in the surface of the user control box 18 to enable the user to indicate, for example, a desire to change the direction of trains, to sound a whistle and to sound a bell. The transformer of the user control box 18 is electrically connected to a plug 22, which can be connected to a standard electrical wall socket (not shown).

Mounted within the locomotive 12 is a speed control system in accordance with one embodiment of the invention.

While the present invention is shown incorporated into the locomotive 12, it can be incorporated into any type of motorized model electric train car or other model electric vehicle. The speed control system is associated with on-board electronics 10 that control the motor of the locomotive. One example of such on-board electronics 10 is shown in detail in FIGS. 2a–2b.

Figure 2B:
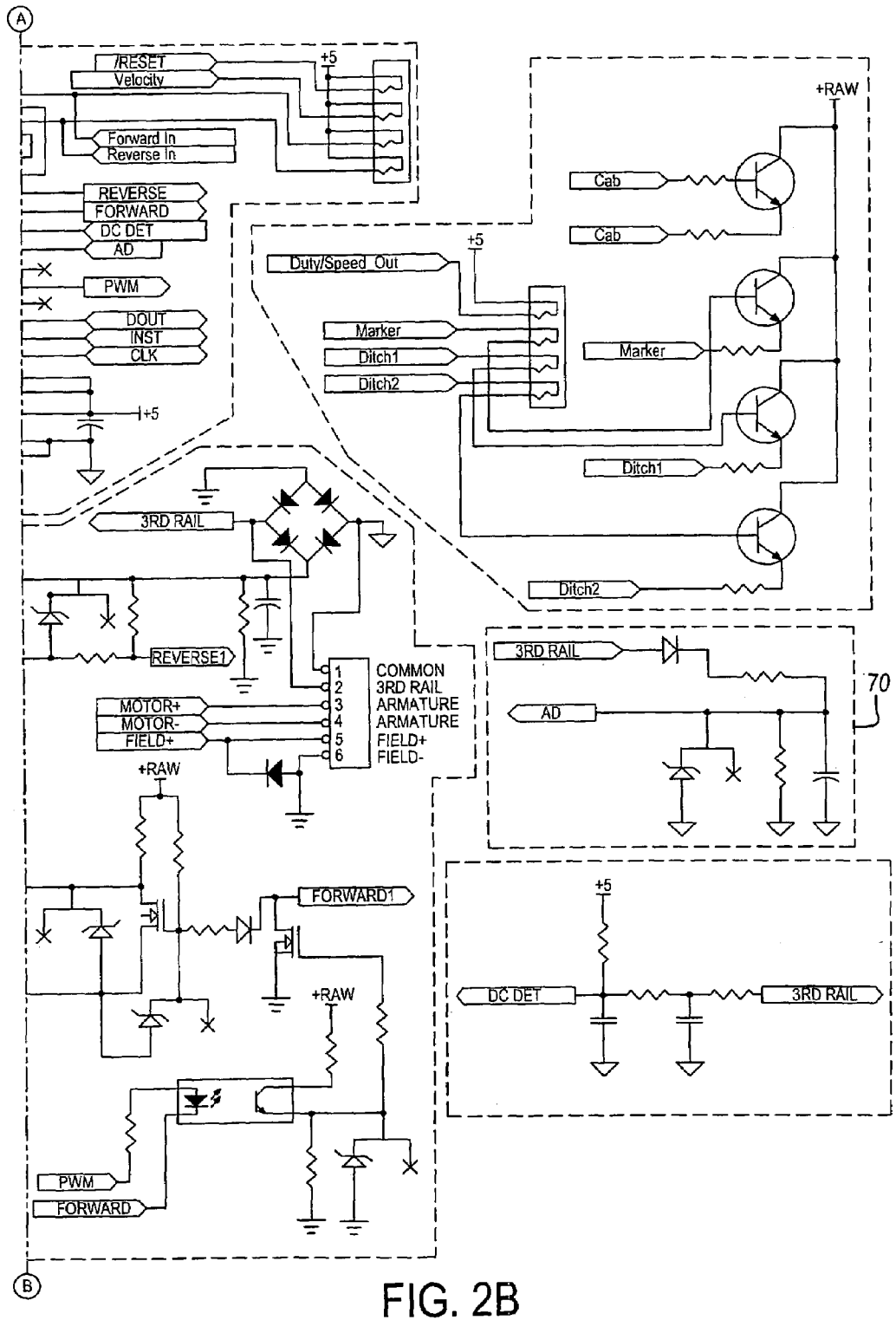

With reference to FIGS. 2a–2b, on-board electronics 10 includes at least a controller 34 and an H-bridge 36 electrically connected to controller 34 to control the direction of rotation of motor 30. Controller 34 can be a microprocessor unit (MPU) 34 configured to receive inputs relating to, for example, sound features, lighting features, smoke features and speed adjustment for the train, and to generate outputs, and may further include peripheral memory chips, etc. However, a microcontroller unit (MCU) can be used in place of a microprocessor. Further, although the use of an MPU or MCU is preferred, the functions herein described with respect to the controller 34 can be performed in whole or in part by equivalent analog and/or digital circuitry. Although many equivalents can be used as the controller 34, the description herein refers to the controller 34 as the MPU 34 to more easily distinguish the controller 34 from the user control box 18.

FIG. 3 shows a simplified schematic diagram of the speed control system according to one embodiment of the invention integrated with certain of the other components of the on-board electronics 10 shown in FIGS. 2a–2b. The operating current of a motor 30 is sensed by a resistance wire 52 that sees a voltage drop proportional to the operating motor current, and a signal 53 corresponding to the operating current is produced. In the on-board electronics according to FIGS. 2a–2b, the sense wire 52 is connected to the H-bridge 36 at node 70. The voltage drop is amplified and provided as an input to the microprocessor unit (MPU) 34. More specifically, the operating voltage across the resistance wire 52 is filtered by capacitor 50 and sensed through an impedance 48 at the non-inverting input of an operational amplifier (op amp) 42. This input voltage is amplified by the gain of the op amp 42, which is determined by resistors 44 and 46. A resistor 40 protects op amp 42 and the input for the MPU 34 from large voltage swings that could generate destructive current spikes. The MPU 34 receives the voltage as analog voltage in the form of operating current signal 53 that it then converts into a digital value representing the operating motor current. It should be noted that this circuit is by example only and its function is to sense and amplify the operating current of the motor 30 as an input to MPU 34, and to isolate the voltage. Any circuit within the level of one of ordinary skill in the art having the necessary functionality can be used to perform these functions.

With continued reference to FIG. 3, a velocity sensor 32 senses the rotational velocity of the motor 30, also known as the operating velocity of the motor, through known methods, and provides a signal 55 corresponding to the operating velocity. The velocity sensor 32 sends the sensed operating velocity signal 55 to the MPU 34 through the input connector 76. The MPU 34 incorporates a proportional integral control loop utilizing sensed operating current in order to more finely control the motor velocity and reduce overshoot when changing motor velocity. Accordingly, the MPU 34 uses the sensed operating motor current, the sensed operating motor velocity, as well as information relating to the motor to gear ratio and wheel diameter of the particular train's wheels to calculate a target current for a target train/motor velocity. As discussed briefly above, MPU 34 includes a peripheral memory into which the motor to gear ration and wheel diameter is programmed and stored. This information is programmed into MPU 34, however, in an exemplary embodiment, the information can be altered by a user using a control device. This information is necessary when performing the current calculation so as to equivocate the velocity from one train type to another so that different motor to gear ratios and wheel diameters will not yield different velocities or require PID tuning. It should be noted that the rotational velocity of the motor has a direct correlation to and can be equated to the linear velocity of the train, as the rotational velocity of the motor is translated into the linear velocity of the train by way of a gear set. This correlation, however, does not take into account any potential slippage in the gear set.

Once the target current is calculated, the MPU 34 then changes the operating current (and the direction of motor rotation, if necessary) to the motor 30 through the H-bridge 36 using, in one exemplary embodiment, pulse-width modulating techniques in order to reach the target current for the target motor velocity corresponding to a desired locomotive speed.

Figure 4:
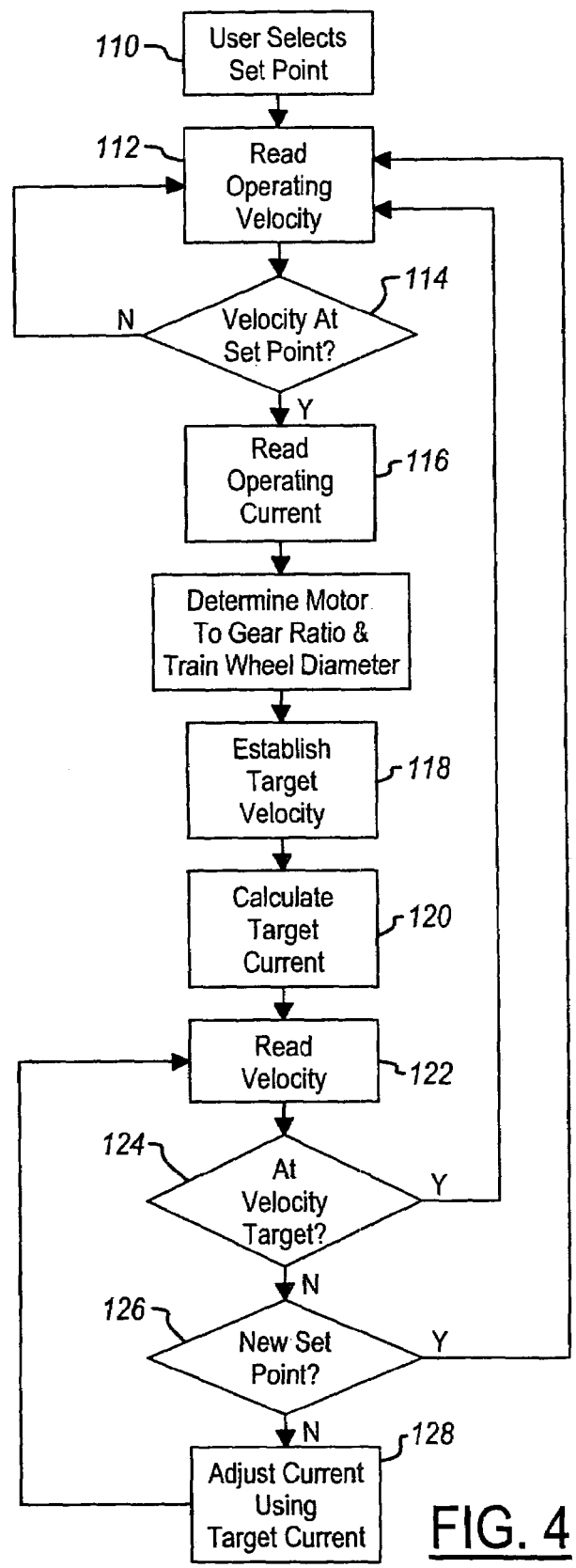
FIG. 4 is a flow diagram of a speed control system for a locomotive according to one embodiment of the present invention.

One way of implementing the speed control system is shown in FIG. 4. The routine starts at 110, when the user selects a set point corresponding to a desired train, and therefore motor, velocity using the knob 20. The MPU 34 reads an operating velocity of the motor, and therefore, the locomotive 12 at 112, and produces an operating velocity signal. Next, at 114 the MPU 34 determines, based on the operating velocity signal, whether or not the operating velocity is at the selected set point. If the operating velocity is not at the set point, then the routine returns to 112 where the operating velocity is once again read.

Returning now to 114, if the operating velocity is at the selected set point, then an operating motor current provided to motor 30 is read at 116, and an operating current signal 53 is produced. Next, the MPU 34 establishes a motor velocity target in a velocity window at 118. MPU 34 is configured with a memory wherein at least one predetermined velocity window corresponding to the operating velocity read at 112 is stored. It should be noted that the memory of MPU 34 may include a plurality of velocity windows, each of which corresponds to a different velocity of motor 30. The velocity window is a small range between an upper velocity limit and a lower velocity limit, and the motor velocity target selected is the velocity value in the window that requires the least amount of current. Accordingly, at 120, the MPU 34 calculates, using the sensed operating velocity, operating current, and respective motor to gear ratio and wheel diameter for the train, a target current for the velocity target so that the motor reaches the target velocity. The MPU 34 then reads the operating motor velocity at 122. The routine next advances to 124 where the MPU 34 determines if the operating motor velocity read is at the motor velocity target. If the operating motor velocity is at the motor velocity target, the routine returns to 112, where the operating velocity of the motor 30 is read.

Returning now to 124, if the operating motor velocity is not at the velocity target, then the routine advances to 126 where the MPU 34 determines whether the user has selected a new set point. If the user has selected a new set point, the routine returns to read the operating velocity of motor 30 at 112. Returning now to 126, if the user has not selected a new set point, then the routine advances to 128 where the MPU 34 adjusts the operating current using the target current from 120 in a standard proportional loop to get to the target motor velocity. In one exemplary embodiment, if the velocity is too low for a given velocity window, the current to motor 30 is decreased. On the other hand, if the velocity is too high for a given velocity window, the current to motor 30 is increased. The routine then returns to read the operating motor velocity at 122. The routine in this flow diagram is by example only, and its function is to control the speed of a locomotive using the sensing of a motor current and the sensing of a motor velocity.

FIG. 5 shows a perspective drawing of two locomotives 12a, 12b coupled together in lashup. Each locomotive 12a, 12b incorporates its own separate and independent on-board electronics 10a, 10b, each incorporating the control electronics of the present invention. As shown, the locomotives 12a, 12b are connected mechanically only using couplers (not shown) and are not connected to each other electrically. Further, the on-board electronics 10a, 10b are not interconnected electrically. Accordingly, the inventive speed control method is used to separately control the velocity of each locomotive 12a, 12b independent of each other. The present invention is particularly useful when operating two or more locomotives 12a, 12b in lashup and when one or more locomotives 12 are added to the middle and/or end of a consist (not shown). One advantage of the invention in this situation is that the electronics 10a, 10b are not required to communicate with each other in order for the locomotives 12a, 12b to travel at the same speed, eliminating a need for electrical connections between locomotives 12a, 12b. Because both the locomotives 12a, 12b on a single track operate on the same power source, using the motor current sensing in addition to the velocity sensing enables each control system on each locomotive 12a, 12b to control its velocity to a single common velocity shared by both the locomotives 12a, 12b, thereby reducing the fighting between locomotives 12a, 12b that may result if the locomotives are operating at different velocities.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method for speed control for a motor of a locomotive of a model electric train, comprising:
   sensing an operating velocity of said motor and producing an operating motor velocity signal;
   sensing an operating current provided to said motor and producing an operating motor current signal;
   providing said operating velocity and current signals to a controller;
   establishing a target motor velocity;
   calculating a target motor current configured so that said motor reaches said target motor velocity; and
   changing said operating current to said target motor current to achieve said target motor velocity.

2. A method in accordance with claim 1 further comprising the step of selecting a velocity set point for said motor.

3. The method in accordance with claim 1 wherein said step of sensing said operating motor current further comprises:
   sensing an operating voltage proportional to the motor current and producing an operating voltage signal; and
   providing said operating voltage signal to said controller.

4. The method in accordance with claim 1 wherein said step of establishing a target motor velocity further comprises:
   selecting a velocity in a velocity window stored in a memory of said controller using said sensed motor operating current.

5. The method in accordance with claim 1 wherein said step of calculating said target motor current further comprises the substep of:
   calculating said target motor current using said sensed operating velocity, said sensed operating current, and information relating to the motor to gear ratio and wheel diameter for said train.

6. The method in accordance with claim 1 wherein said step of calculating a target current further comprises:
   determining a minimum current that enables the motor to operate at a lowest motor velocity within a velocity window.

7. The method in accordance with claim 1 wherein said step of changing an operating current to the electric motor further comprises:
   decreasing the current if a velocity is too low for a velocity window; and
   increasing the current if the velocity is too high for the velocity window.

8. An apparatus for speed control for a locomotive of a model electric train, comprising:
   an electric motor;
   a current sensor for sensing an operating current of said motor;
   a velocity sensor for sensing an operating velocity of said motor; and
   a controller connected to the motor wherein the controller is operative to calculate a target motor current for a target motor velocity and to adjust the operating current to the electric motor to reach the target current.

9. The apparatus in accordance with claim 8 further comprising an H-Bridge connected between said controller and said motor configured to control the direction and speed of said motor in response to a control signal generated by said controller.

10. The apparatus in accordance with claim 8 wherein the controller is configured with a standard proportional integral loop to control said motor velocity and reduce overshoot when changing said motor velocity.

11. The apparatus in accordance with claim 8 further comprising:
    a resistance wire that senses an operating voltage proportional to the operating motor current; and
    a circuit whose function is to amplify said operating voltage, provide an amplified input to said controller, and to isolate said operating voltage.

12. The apparatus in accordance with claim 11 wherein said circuit includes an operational amplifier.

13. The apparatus in accordance with claim 8 further comprising a velocity sensor connected to an output shaft of said motor.

14. The apparatus in accordance with claim 8 wherein the controller comprises:
    a microprocessor with peripheral memory chips.

15. The apparatus in accordance with claim 14 wherein said peripheral memory chips store information regarding the motor to gear ratio and wheel diameter for said train.

16. The apparatus in accordance with claim 8 wherein the controller comprises:
   a microcontroller.

17. The apparatus in accordance with claim 8 wherein two or more locomotives are coupled together in a lashup configuration.

18. The apparatus in accordance with claim 8 wherein at least one locomotive is located in the middle of a consist.

19. The apparatus in accordance with claim 8 wherein at least two locomotives are coupled in the middle of a consist.

20. The apparatus in accordance with claim 8, wherein any number of locomotives are joined in a combination of at least two of the following coupling configurations:
   coupled in lashup;
   coupled in the middle of the consist; and
   coupled at the end of the consist.

\* \* \* \* \*